(12) United States Patent
Hasegawa (10) Patent No.: US 7,855,486 B2
(45) Date of Patent: Dec. 21, 2010

(54) CLAW POLE GENERATOR, ESPECIALLY FOR BICYCLE GENERATOR HUB

(75) Inventor: Hiroshi Hasegawa, Osaka (JP)

(73) Assignee: Shimano Inc., Osaka (JP)

( * ) Notice: Subject to any disclaimer, the term of this patent is extended or adjusted under 35 U.S.C. 154(b) by 39 days.

(21) Appl. No.: 12/485,452

(22) Filed: Jun. 16, 2009

(65) Prior Publication Data

US 2010/0117494 A1 May 13, 2010

(30) Foreign Application Priority Data

Nov. 12, 2008 (JP) .............................. 2008-289437

(51) Int. Cl.
*H02K 1/12* (2006.01)
(52) U.S. Cl. .................................... 310/257
(58) Field of Classification Search ...............
310/216.001–216.137, 257
See application file for complete search history.

(56) References Cited

U.S. PATENT DOCUMENTS 5,962,938 A * 10/1999 Bobay et al. .............. 310/67 R 6,891,305 B2 * 5/2005 Park ..................... 310/216.004

FOREIGN PATENT DOCUMENTS

| JP | 32-8026 | U | 7/1932 |
| JP | 03-117357 | U | 12/1991 |
| JP | 2004-229403 | A | 8/2004 |
| JP | 3740555 | B2 | 11/2005 |
| JP | 2009-55750 | * | 3/2009 |

* cited by examiner

*Primary Examiner*—Nguyen N Hanh
(74) *Attorney, Agent, or Firm*—Global IP Counselors, LLP (57) ABSTRACT

A claw pole generator is basically provided with a circularly arranged permanent magnet and an internal stationary unit with a yoke and a coil. The yoke includes a first laminated yoke and a second laminated yoke. The first and second laminated yokes include a disc-shaped connecting portion arranged on one side of the coil and a plurality of outer circumferential yoke portions that are arranged between the coil and the permanent magnet with circumferential spaces in-between. Each of the outer circumferential yoke portions has a plurality of outer circumferential yoke layers laminated overlying each other along a radial direction with respect to the axial centerline of the coil. An outermost one of the outer circumferential yoke layers that is closest to the permanent magnet with a longer axial length than an innermost one of the outer circumferential yoke layers.

12 Claims, 11 Drawing Sheets

CLAW POLE GENERATOR, ESPECIALLY FOR BICYCLE GENERATOR HUB

CROSS-REFERENCE TO RELATED APPLICATIONS

This application claims priority under 35 U.S.C. §119 to Japanese Patent Application No. 2008-289437, filed Nov. 12, 2008. The entire disclosure of Japanese Patent Application No. 2008-289437 is hereby incorporated herein by reference.

BACKGROUND OF THE INVENTION

1. Field of the Invention

This invention generally relates to a claw pole generator. More specifically, the present invention relates to a claw pole generator, especially for a bicycle generator hub that is contrived to suppress the occurrence of eddy currents.

2. Background Information

Bicycle generator hubs are known that uses a claw pole type generator. Generally, a conventional claw pole generator has a yoke having first and second laminated yokes. Each laminated yokes has a plurality of plate-like pieces laminated together. In a conventional claw pole generator with laminated yokes, each of the plate-like pieces has a pair of circular disc-like portions and outer circumferential yoke portions. The outer circumferential yoke portions are formed in a radial fashion on and folded over from a peripheral edge of the circular disc-like portion so as to intersect generally perpendicularly with respect to the circular disc-like portion (e.g., Japanese Laid-Open Patent Publication No. 2004-229403). The lengths of the outer circumferential yoke portions of the plate-like pieces become longer as one moves inward and the positions of the tip ends thereof are aligned with respect to a radial direction.

In the conventional generator, the circular disc-like portions of the laminated plate-like pieces of the first and second laminated yokes are attached to a hub shaft on both ends of a coil so as to be separated from each other along an axial direction. The first and second laminated yokes are arranged such that the outer circumferential yoke portions of the laminated plate-like pieces of the first laminated yoke are alternately interdisposed with respect to the outer circumferential yoke portions of the laminated plate-like pieces of the second laminated yoke with the tip ends of the outer circumferential yoke portions of the first laminated yoke facing in the opposite direction as the tip ends of the outer circumferential yoke portions of the second laminated yoke.

In the conventional generator, the outer circumferential yoke portions of the plate-like pieces of the laminated yokes are arranged to be separated by a small gap from the permanent magnet that is fixed to a hub shell in order to increase a generating efficiency. By configuring the yoke to have first and second laminated yokes arranged with the outer circumferential yoke portions interdisposed in an alternating fashion, losses caused by eddy currents can be decreased and the output can be improved. Examples of two conventional generators are discloses in Japanese Laid-Open Utility Model Publication No. H03-117357 and Japanese Examined Utility Model Application Publication No. 32-8026.

SUMMARY OF THE INVENTION

It has been found with conventional generators that there is the possibility that the outer circumferential surface of the yoke will be uneven if the angles at which the outer circumferential yoke portions are folded over are even slightly different from one another. Since an outer circumferential portion of each of the laminated yokes is separated from the permanent magnet by only a small gap, a protruding outer circumferential portion of a plate-like piece could possibly contact the permanent magnet if the outer circumferential surface of the yoke is uneven.

One object of the present invention is to provide a claw pole generator in which folded-over outer circumferential yoke portions do not contacting a magnet.

A claw pole generator according to a first aspect basically comprises a circularly arranged permanent magnet and an internal stationary unit. The internal stationary unit includes a ring-shaped coil arranged radially inward of the permanent magnet and a yoke surrounding a perimeter of the coil. The permanent magnet is rotatably arranged with respect to the internal stationary unit. The yoke includes a stator yoke and a core yoke. The stator yoke is arranged between the coil and the permanent magnet. The core yoke is arranged radially inward of the coil and magnetically coupled to the stator yoke. The stator yoke includes a first laminated yoke and a second laminated yoke. Each of the first and second laminated yokes includes at least two plate-like pieces having a substantially circular disc-shaped connecting portion arranged on one side of the coil and a plurality of outer circumferential yoke portions that are folded over from an outer circumferential surface of the connecting portion and arranged between the coil and the permanent magnet with circumferential spaces in-between. The connecting portions of each of the first and second laminated yokes has a plurality of connecting layers overlying each other in an axial direction with respect to an axial centerline of the coil. Each of the outer circumferential yoke portions has a plurality of outer circumferential yoke layers laminated overlying each other along a radial direction with respect to the axial centerline of the coil. Each of the outer circumferential yoke portions has an outermost one of the outer circumferential yoke layers that is closest to the permanent magnet with a longer axial length than an innermost one of the outer circumferential yoke layers.

With this claw pole generator, the permanent magnet is arranged opposite the stator yoke and an alternating magnetic flux is generated when the permanent magnet and the stator yoke undergo relative rotation. The alternating magnetic flux causes an electric current to be generated in the coil. More specifically, the alternating magnetic flux is produced by the generator alternating between a state in which the outer circumferential yoke portions of the first laminated yoke act as north (N) poles and the outer circumferential yoke portions of the second laminated yoke act as south (S) poles and a state in which the outer circumferential yoke portions of the first laminated yoke act as south poles and the outer circumferential yoke portions of the second laminated yoke act as north poles. During electricity generation, eddy currents are produced in addition to the alternating magnetic flux, but the occurrence of eddy currents can be suppressed because the yoke is made of laminated plate-like pieces. Among the outer circumferential yoke portions of the two or more plate-like pieces constituting the claw pole type stator yoke (which is contrived to suppress the occurrence of eddy current), the outermost one of the outer circumferential yoke layers of the outer circumferential yoke portions that are close to the permanent magnet have the largest lengths. Thus, if the gap between the inner circumference of the permanent magnet and the outer circumferential yoke portions that are close to the permanent magnet can be held constant, then the gap with respect to the permanent magnet can be maintained. Consequently, the yoke will be less likely to contact the permanent magnet even if the gap between the permanent magnet and the outer circumferential yoke portions of the first and second laminated yokes (each of which is made of at least two plate-like pieces laminated together) is small.

According to a second aspect, the claw pole generator of the first aspect is provided such that the outermost one of the outer circumferential yoke layers and an immediately adjacent one of the outer circumferential yoke layers have the same axial length. With this aspect, even if the thickness of the plate-like pieces forming the outer circumferential yoke portions is one mm or less, the two outer layers of the outer circumferential yoke portions close to the permanent magnet can be reinforced with respect to the layers of the outer circumferential yoke portions arranged inward thereof. Thus, the strength of the outer circumferential yoke portions can be ensured even if the plate-like pieces are made of a thin plate material.

According to a third aspect, the claw pole generator of the first or second aspect is provided such that the outer circumferential yoke portions extend from the connection portions at angles of substantially 90 degrees. With this aspect, since the outer circumferential yoke portions are folded over from the connection portions at angles of substantially 90 degrees, the outermost outer circumferential yoke portions are made to face opposite the inner circumferential portions of the permanent magnet in a more precise fashion and the outer circumferential yoke portions are even less likely to contact the permanent magnet.

According to a fourth aspect, the claw pole generator of any one of the first to third aspects is provided such that the core yoke is formed as a separate entity from the first and second laminated yokes with the connecting portions of the first and second laminated yokes being magnetically coupled to the core yoke. With this aspect, it is easier to fabricate the plate-like pieces because the core yoke is a separate entity.

According to a fifth aspect, the claw pole generator of the first to fourth aspects is provided such that the internal stationary unit further includes a bobbin having a cylindrical portion extending in an axial direction and a pair of flange portions provided on both axially facing ends of the cylindrical portion. Furthermore, the coil is wound onto an external circumference of the cylindrical portion. With this aspect, it is easier to neatly arrange the windings of the coil because the coil is wound onto the bobbin. Additionally, the bobbin can be used to more easily position the first and second laminated yokes.

According to a sixth aspect, the claw pole generator of the first to fourth aspects is provided such that the internal stationary unit further includes a hub shaft that is configured to be mounted to a bicycle frame of a bicycle, and the permanent magnet includes a cylindrical hub shell with bearings rotatably supporting the hub shell with respect to the hub shaft. With this generator hub, the permanent magnet and the internal stationary unit undergo relative rotation when the wheel rotates. Since the permanent magnet and the outer circumferential yoke portions face opposite each other, an alternating magnetic flux is produced in the core yoke when the permanent magnet and the internal stationary unit undergo relative rotation. More specifically, the alternating magnetic flux is produced by the generator alternating between a state in which the outer circumferential yoke portions of the first laminated yoke act as north poles and the outer circumferential yoke portions of the second laminated yoke act as south poles and a state in which the outer circumferential yoke portions of the first laminated yoke act as south poles and the outer circumferential yoke portions of the second laminated yoke act as north poles. During electricity generation, eddy currents are produced in addition to the alternating magnetic flux, but the occurrence of eddy currents can be suppressed because the yoke is made of laminated plate-like pieces.

When the lengths of the outer circumferential yoke portions of the plate-like pieces constituting the claw pole type stator yoke (which is contrived to suppress the occurrence of eddy current) become gradually shorter as one moves radially inward away from a outer circumferential yoke portion that is close to a permanent magnet. Since only the outermost outer circumferential yoke portions face opposite the permanent magnet, it is easier to maintain a constant gap between the outermost outer circumferential yoke portions and the radially inward facing portions of the permanent magnet. Consequently, the yoke will be less likely to contact the permanent magnet even if the gap between the permanent magnet and the outer circumferential yoke portions of the first and second laminated yokes (each of which is made of a plurality of plate-like pieces laminated together) is small.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
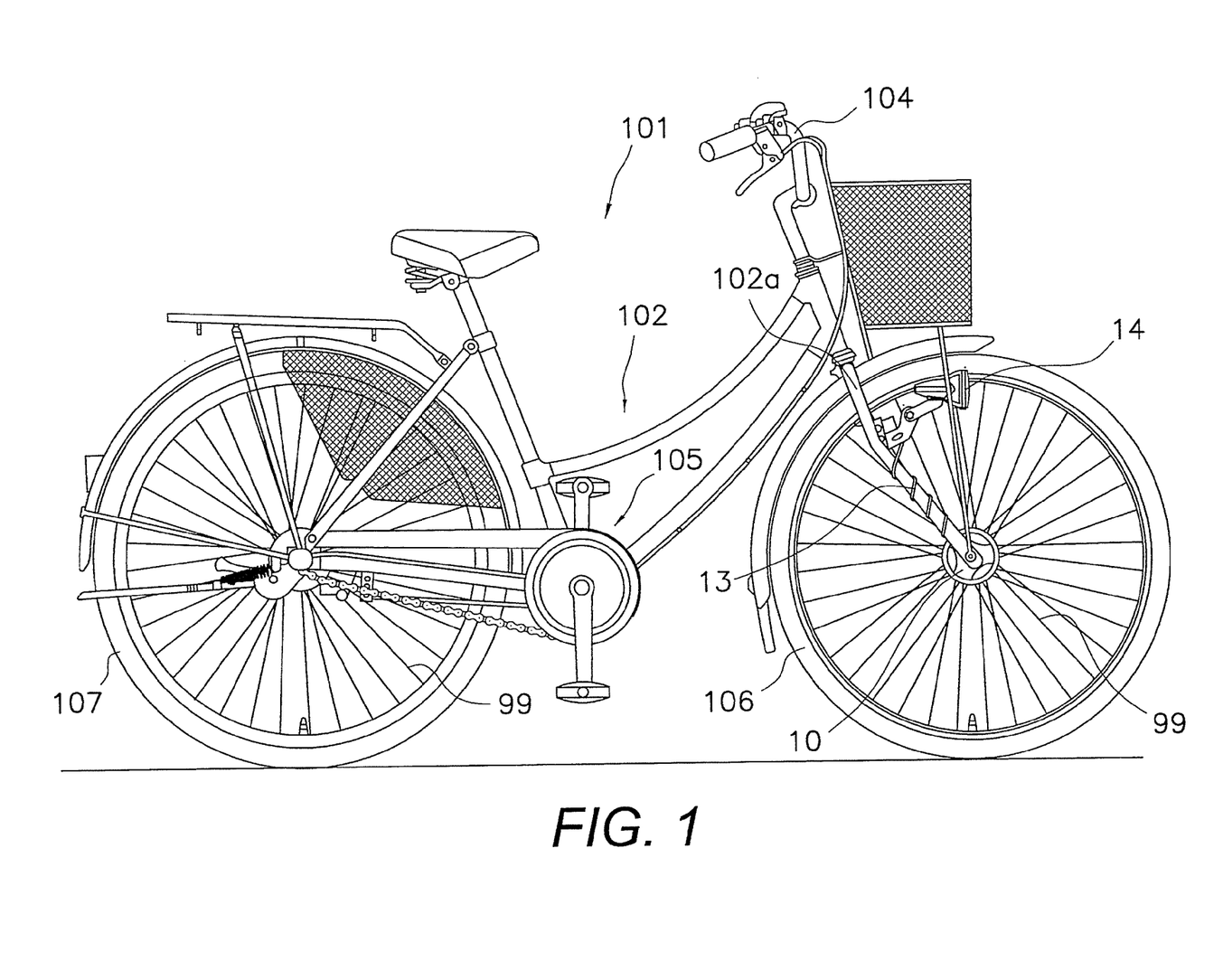
FIG. 1 is a side elevational view of a bicycle with an electric generator hub in accordance with a first embodiment.

Referring initially to FIG. 1, a bicycle 101 is illustrated with a generator hub 10 in accordance with a first embodiment. The bicycle 101 is one example of a human-powered vehicle. The bicycle 101 includes a frame 102, a handlebar 104, a drive unit 105, a front wheel 106 and a rear wheel 107. The frame 102 includes a front fork 102a. The drive unit 105 includes a chain, pedals and the like. The front and rear wheels 106 and 107 are bicycle wheels having a plurality of spokes 99. The front wheel 106 has the electric generator hub 10 that is incorporated therein. Electricity generated by the electric generator hub 10 is supplied to a front lamp or headlight 14. by a power supply wire 13. In other words, the power supply wire 13 is arranged to supply electric power generated by the generator hub 10 to the front lamp 14. The front lamp 14 is also equipped with an optical or light sensor.

Figure 2:
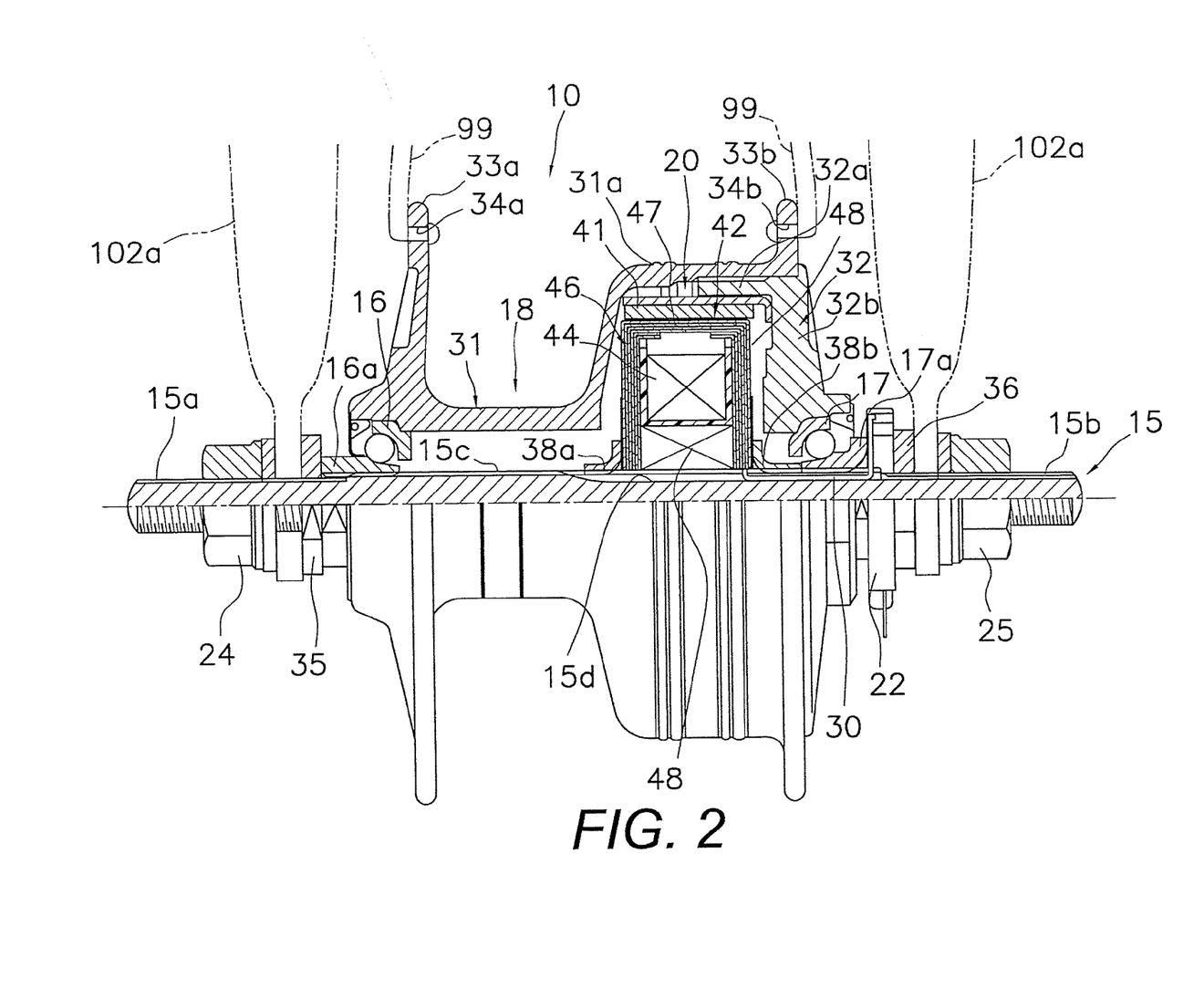
FIG. 2 is a front elevational view of the generator hub according to the first embodiment, with an upper half of the generator hub shown in cross section.

The generator hub 10 shown in FIG. 2 is attached to a distal end of the front fork 102a together with the front wheel 106 of the bicycle. The generator hub 10 includes a hub shaft 15, a pair of bearings 16 and 17, a hub shell 18, a generator mechanism 20 and a connector 22. The hub shaft 15 is fastened at both ends to the front fork 102a. The bearings 16 and 17 are arranged on the outside circumference of the hub shaft 15. The hub shell 18 is rotatably supported on the hub shaft 15 by the bearings 16 and 17. The generator mechanism 20 is an example of a claw pole generator that is arranged between the hub shaft 15 and the hub shell 18. The connector 22 supplies electric power generated by the generator mechanism 20 to an external electric device (e.g., the front lamp 14). The power supply wire 13 is connected to the connector 22.

Figure 4:
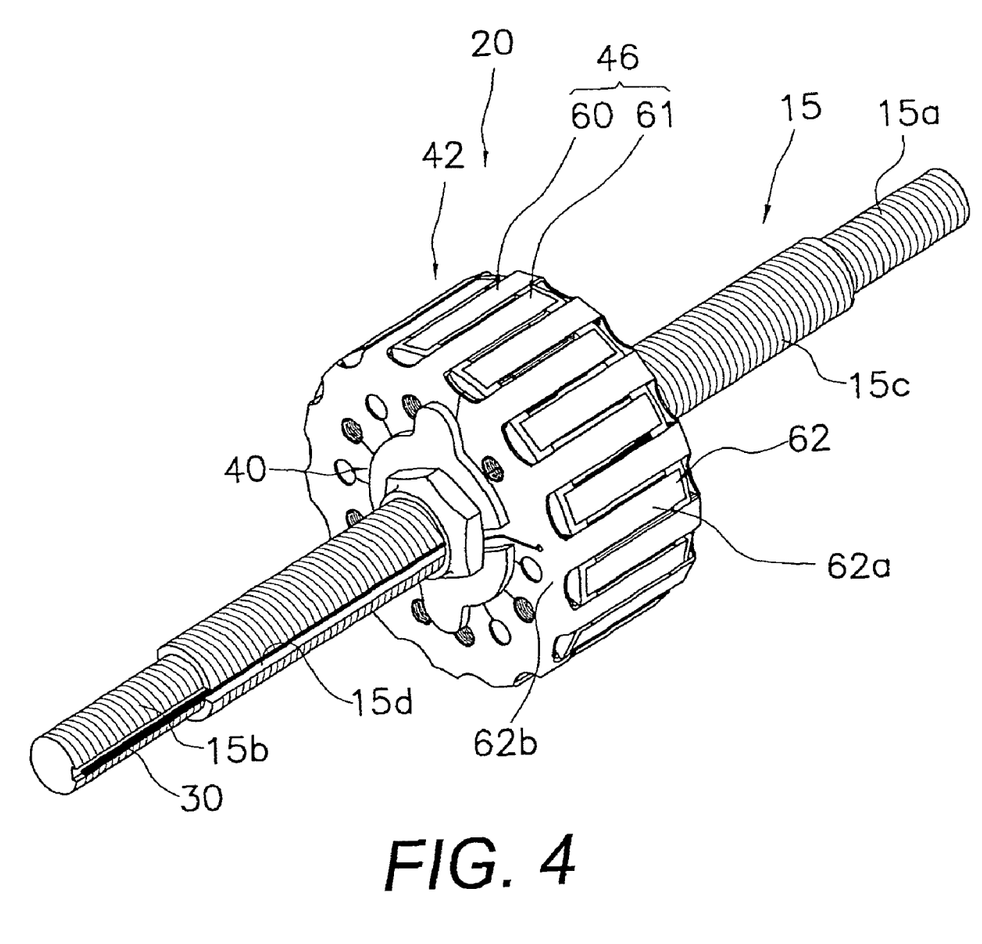
FIG. 4 is a perspective view of an internal stationary (fixed) unit of the electric generator illustrated in FIGS. 2 and 3 in accordance with the first embodiment.

As shown in FIGS. 2 and 4, the hub shaft 15 has first threaded portions 15a and 15b that are formed on both ends of the outside circumferential surface of the hub shaft 15. The hub shaft 15 is fastened non-rotatably to the front fork 102a with fastening nuts 24 and 25, which are screwed onto the first threaded portions 15a and 15b. The hub shaft 15 has a second externally threaded portion 15c with a larger diameter than the first threaded portions 15a and 15b. The second externally threaded portion 15c is formed between the first threaded portions 15a and 15b. A wire passage groove 15d is formed in the outside circumferential surface of the hub shaft 15 for passing an internal wire 30 that is connected between the generator mechanism 20 and the connector 22. The wire passage groove 15d spans from a portion where the generator mechanism 20 is mounted to an end portion of the first externally threaded portion 15b.

The hub shell 18 has a case main body 31 and a lid member 32. The lid member 32 covers one end (right-hand end in FIG. 2) of the case main body 31. The case main body 31 is a cylindrical member that extends along the axial direction of the hub shaft 15. The case main body 31 has a bulged portion 31a at one end (right-hand end in FIG. 2) that is bulged in the radially outward direction in comparison to the other end. Each of the ends of the case main body 31 has a hub flange portion 33a or 33b that is formed on an outer circumferential surface of the case main body 31. The hub flange portion 33a is provided with a plurality of spoke holes 34a. The hub flange portion 33b is provided with a plurality of spoke holes 34b. The spoke holes 34a and 34b receive the radially inward end portions of the spokes 99. The spoke holes 34a and 34b are arranged with equal spacing along a circumferential direction of the respective hub flange portions 33a and 33b. The spoke holes 34a are arranged to be substantially 180 degrees out of phase with respect to the spoke holes 34b. The lid member 32 has a threaded cylindrical portion 32a that screws into an internal surface of the bulged portion 31a of the case main body 31. The lid member 32 has a rotary support portion 32b that has a circular disc shape. The rotary support portion 32b is rotatably mounted to the hub shaft 15. The lid member 32 is thus screw-fastened to the case main body 31 by the threaded cylindrical portion 32a.

The bearings 16 and 17 are cup and cone type bearings. In particular, the bearing 16 includes a cone 16a that is threaded onto the first threaded portions 15a of the hub shaft 15. Similarly, the bearing 17 includes a cone 17a that is threaded onto the first threaded portions 15b of the hub shaft 15. The cones 16a and 17a serve as inner races of the bearings 16 and 17 and constitutes ball pushing parts. The hub shell 18 (the case main body 31 and the lid member 32) is secured to the hub shaft 15 with the cones (ball pushing parts) 16a and 17a that are screwed onto the first threaded portions 15a and 15b of the hub shaft 15. Each of the cones 16a and 17a is positioned and locked with a locknut 35 or 36. In addition to locking the cones 17a, the right-hand locknut 36 secures the connector 22 to the hub shaft 15.

The generator mechanism 20 is a claw pole type generator mechanism that basically includes a circularly arranged permanent magnet 41 and an internal stationary unit 42. The permanent magnet 41 is fixed to an internal circumferential surface of the threaded cylindrical portion 32a of the lid member 32 of the hub shell 18. The internal stationary unit 42 is fixed to the hub shaft 15 such that it is arranged facing opposite a radially inward facing portion of the permanent magnet 41. The internal stationary unit 42 rotatably mounted with respect to the permanent magnet 41. The permanent magnet 41 is fixed to an internal surface of the bulged portion 31a of the case main body 31 of the hub shell 18. The permanent magnet 41 includes a plurality of (e.g., four) magnet bodies divided at equal intervals in a circumferential direction. The permanent magnet 41 is magnetized so as to have north (N) and south (S) poles arranged alternately with equal spacing such that each faces an outer circumferential portion of a yoke 46 (discussed later).

Figure 3:
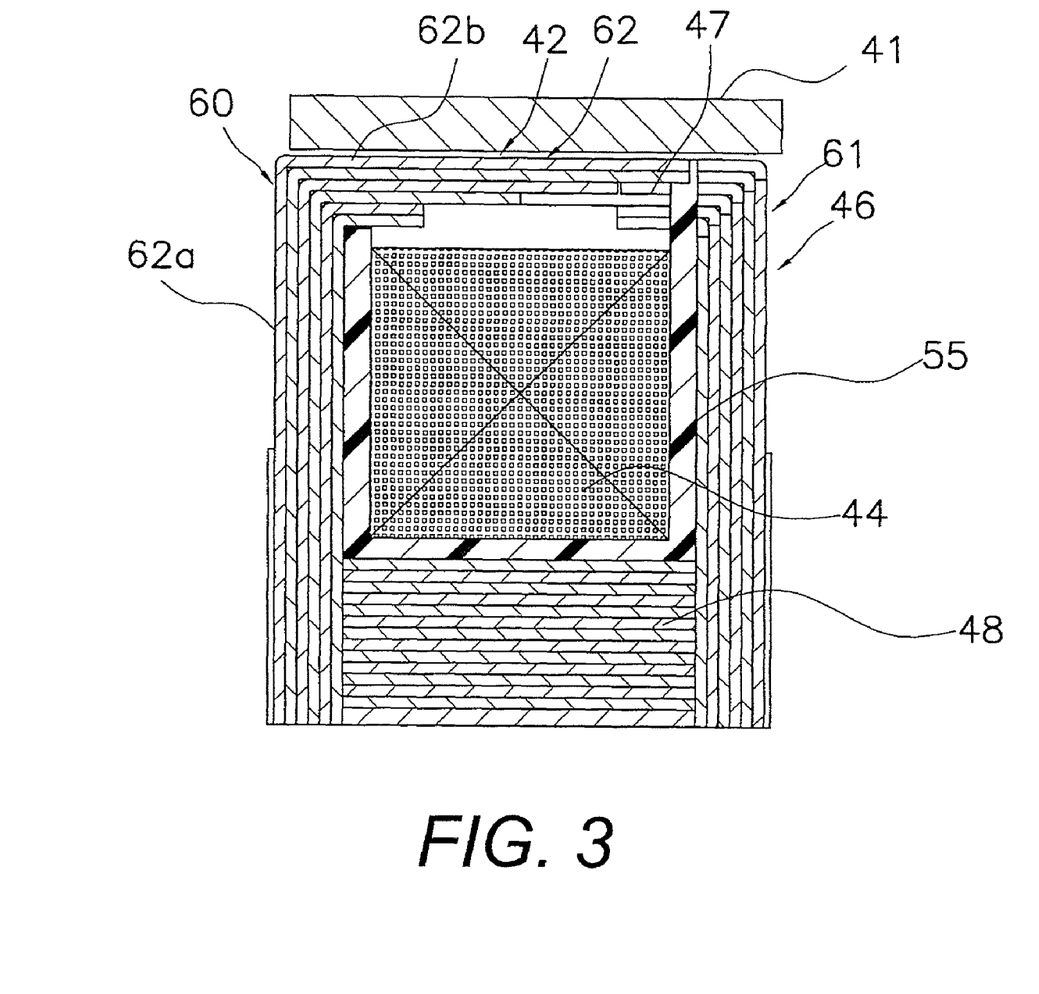
FIG. 3 is an enlarged cross sectional view of the upper half of the bobbin (coil assembly) of the electric generator hub.

As shown in FIGS. 2 and 3, the internal stationary unit 42 includes a ring-shaped coil 44 and a yoke 46. The ring-shaped coil 44 is arranged radially inward of the permanent magnet 41. The yoke 46 is provided so as to surround a perimeter of the coil 44. The coil 44 and the yoke 46 are non-rotatably secured to the hub shaft 15 by a pair of mounting nuts 38a and 38b. The mounting nuts 38a and 38b are screwed onto the second externally threaded portion 15c so as to sandwich the coil 44 and the yoke 46. The coil 44 and the yoke 46 are positioned in the axial direction such that they are housed inside the bulged portion 31a.

Figure 5:
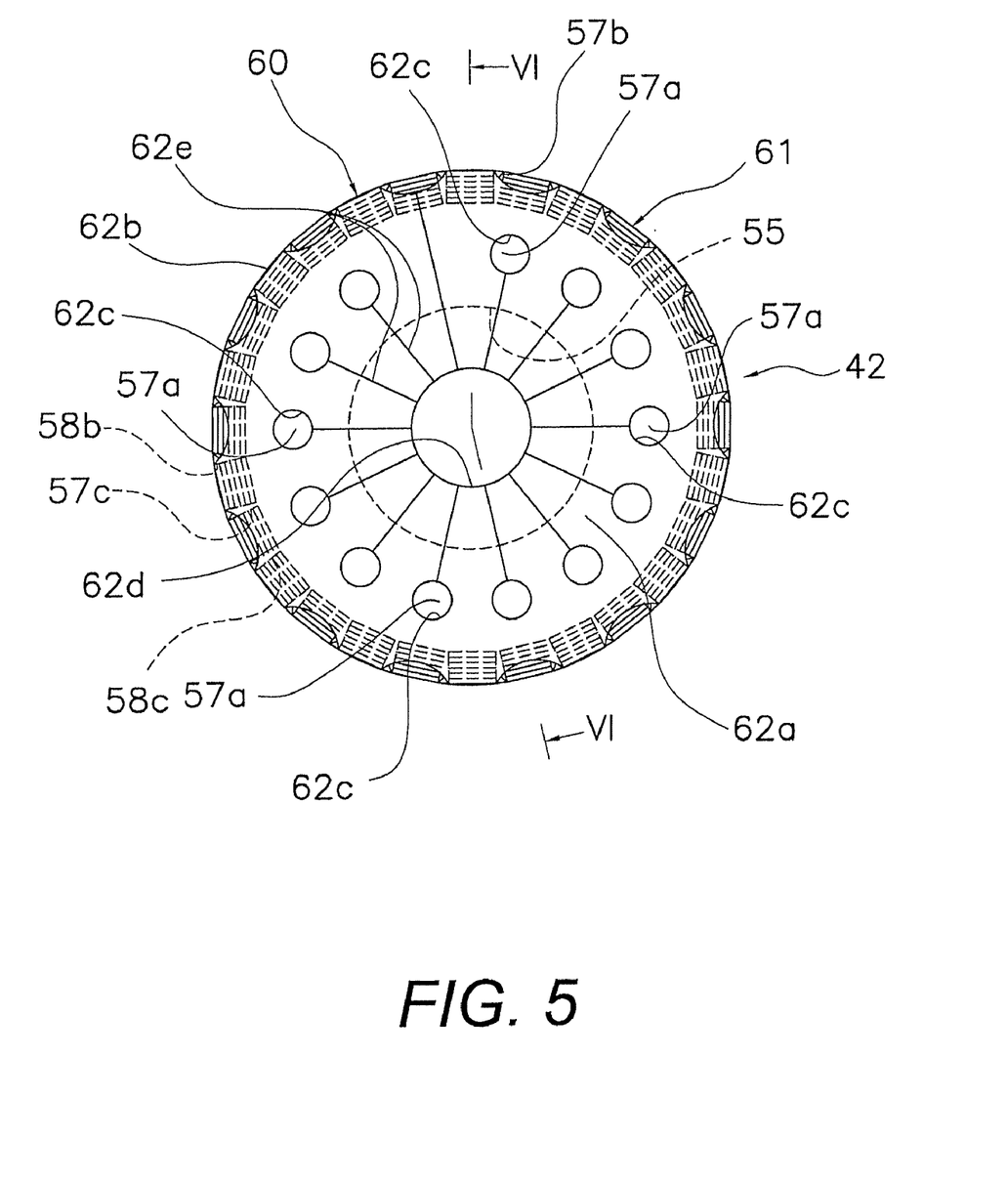
FIG. 5 is a side elevational view of the bobbin (coil assembly) of the internal stationary (fixed) unit illustrated in FIG. 4 in accordance with the first embodiment.
Figure 6:
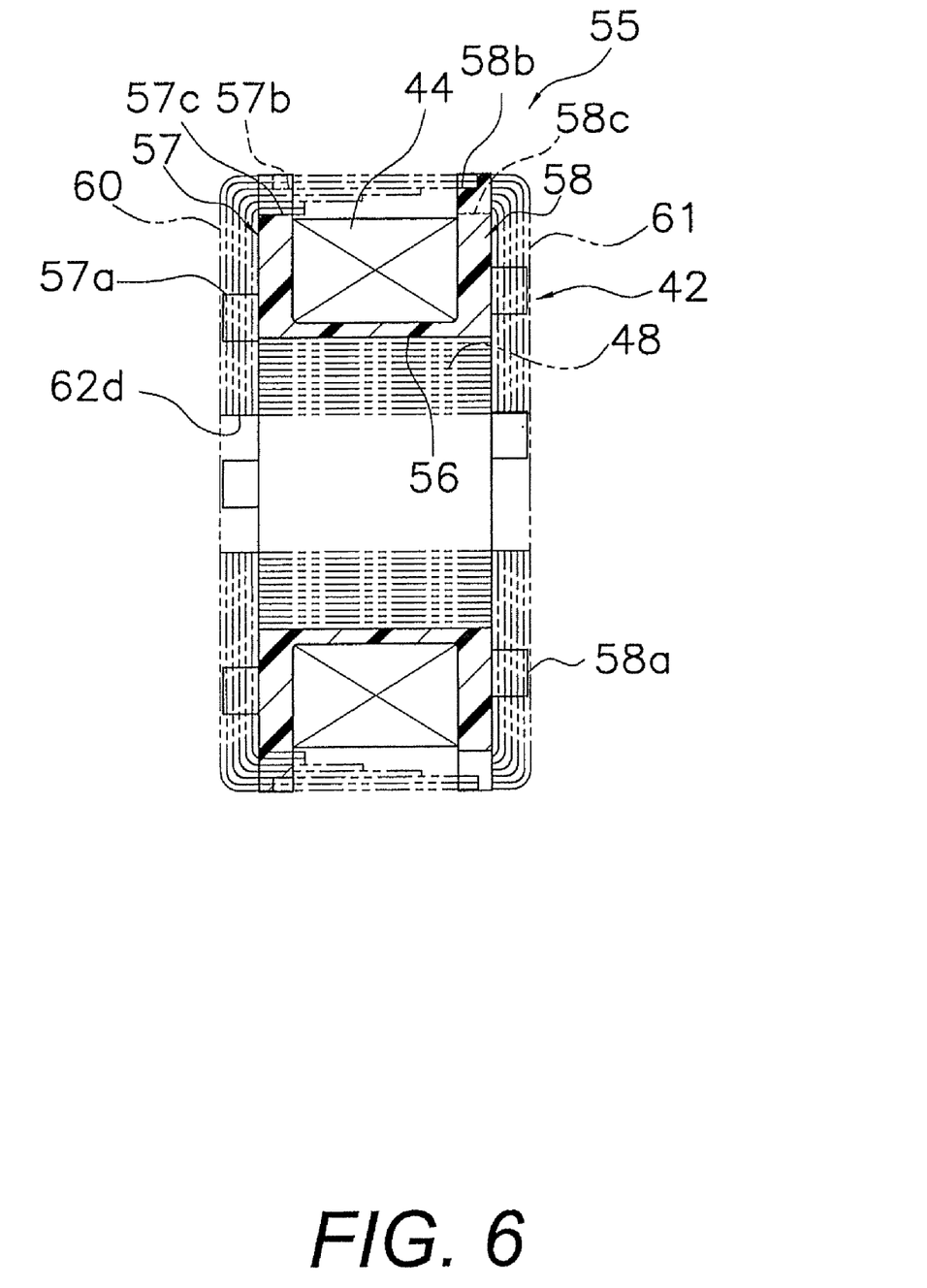
FIG. 6 is a longitudinal cross sectional view of the bobbin (coil assembly) of the internal stationary (fixed) unit taken along the section line VI-VI of FIG. 7 in accordance with the first embodiment.

The coil 44 is wound onto a bobbin 55 like that shown in FIGS. 3, 5 and 6. As best seen in FIG. 6, the bobbin 55 has a cylindrical trunk portion 56, a first flange portion 57 and a second flange portion 58. The cylindrical trunk portion 56 has an outside circumference on which the coil 44 is wound. The first and second flange portions 57 and 58 are formed on both axial end portions of the trunk portion 56. The first flange portion 57 has an axially outward facing surface with a plurality of (e.g., four) circular rod-shaped positioning protrusions 57a. The positioning protrusions 57a are arranged to be spaced apart from one another along a circumferential direction. Similarly, the second flange portion 58 has an axially outward facing surface with a plurality of (e.g., four) circular rod-shaped positioning protrusions 58a. The positioning protrusions 58a are arranged to be spaced apart from one another along a circumferential direction. The positioning protrusions 57a and 58a are provided to position the yoke 46 along a circumferential direction.

As shown in FIGS. 2 and 4, one end of the coil 44 (right-hand end in FIG. 2) is electrically connected to the connector 22 via the internal wire 30 that passes through the wire passage groove 15d. The other end of the coil 44 (left-hand end in FIG. 2) is electrically connected to the hub shaft 15 through the mounting nut 38a.

Figure 7:
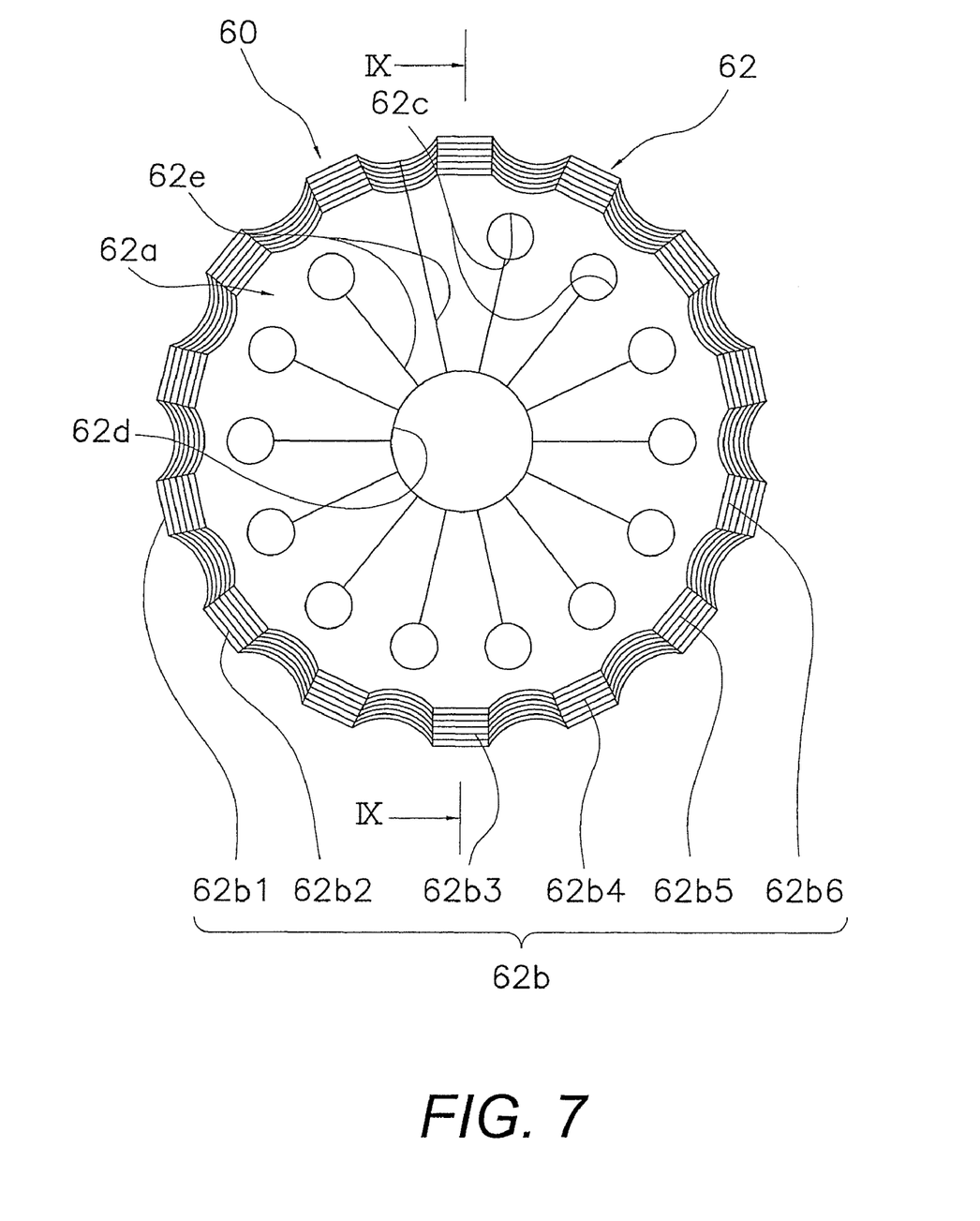
FIG. 7 is a side elevational view of a first laminated yoke of the electric generator in accordance with the first embodiment.
Figure 8:
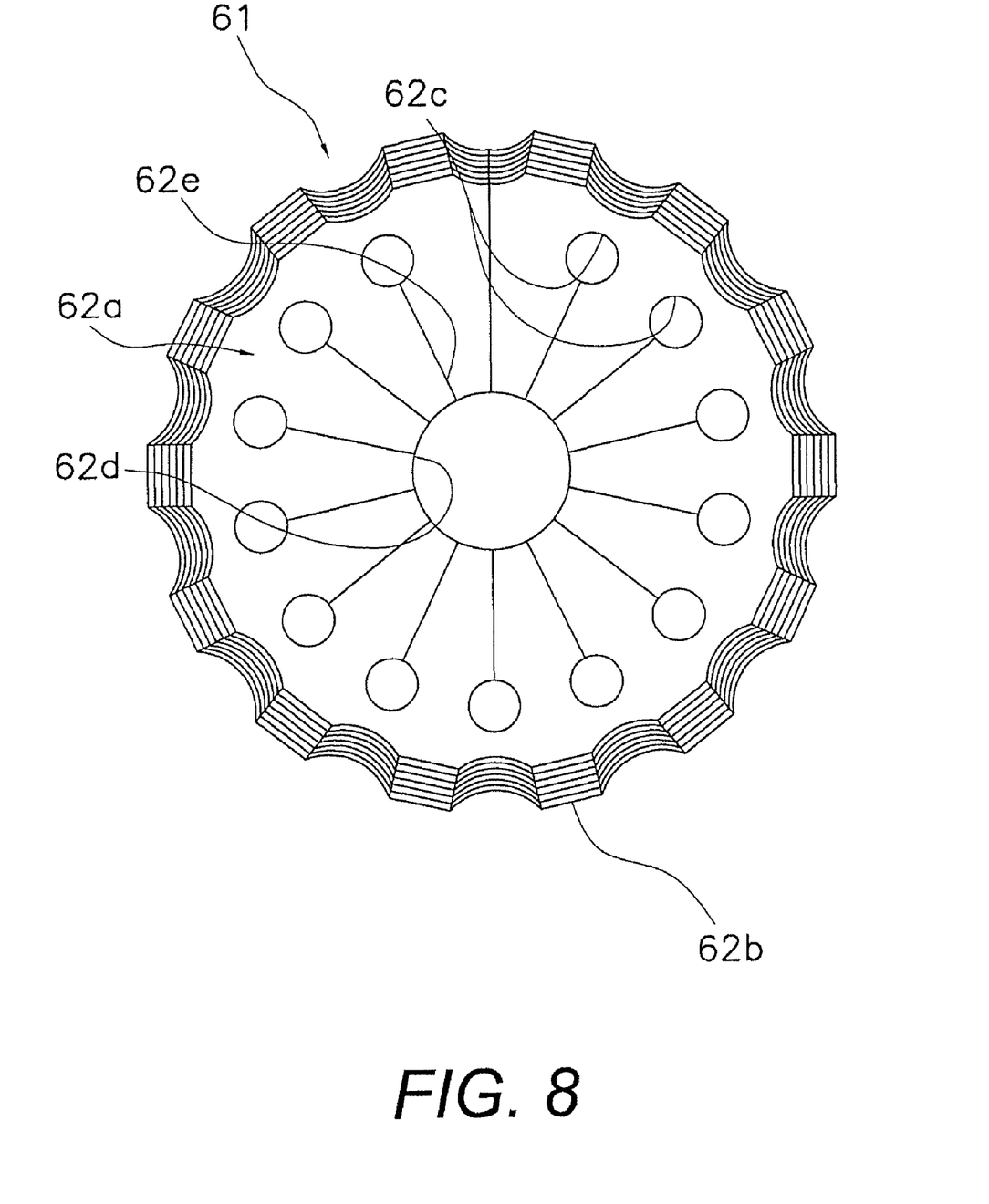
FIG. 8 is a side elevational view of a second laminated yoke of the electric generator in accordance with the first embodiment.
Figure 9:
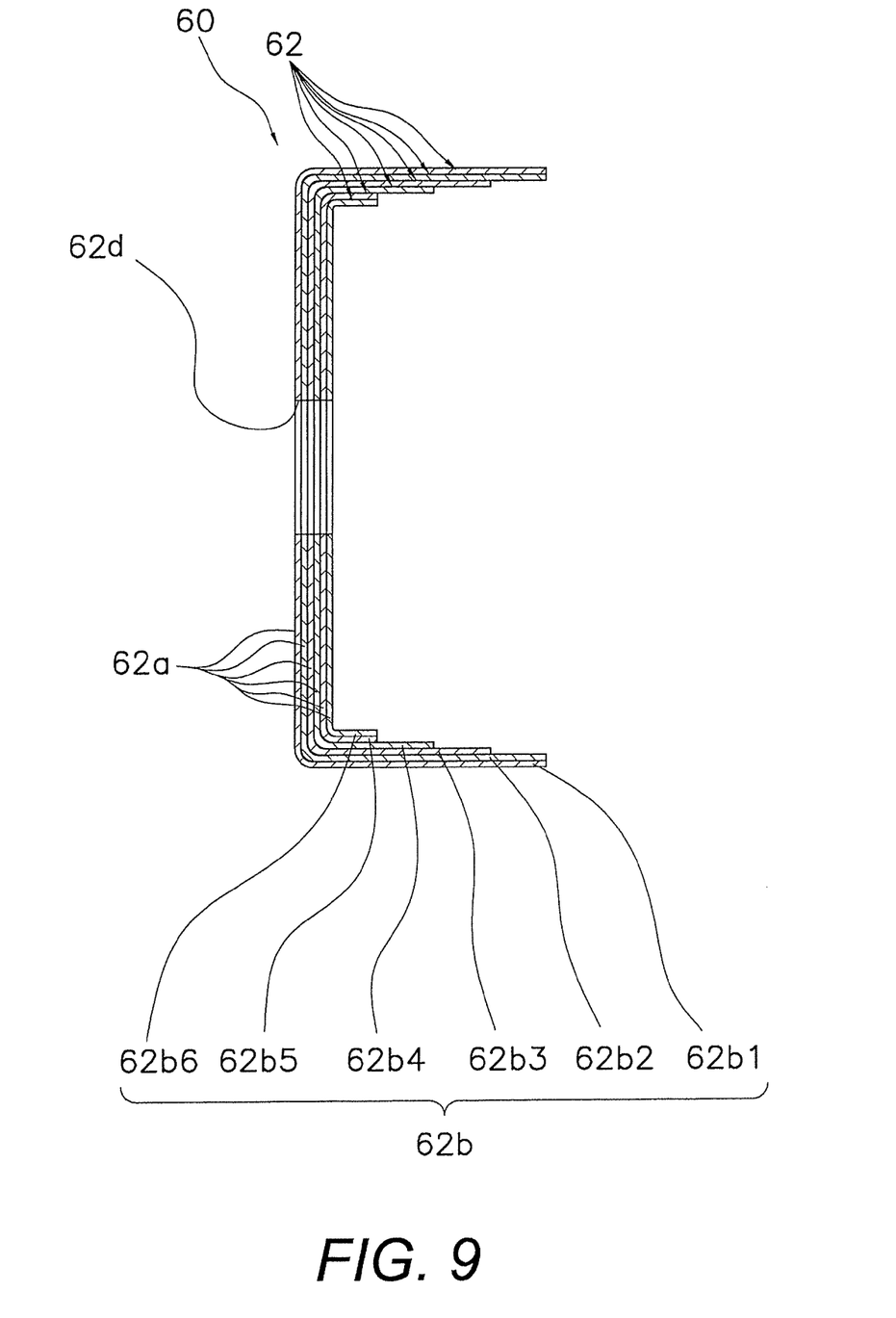
FIG. 9 is a cross sectional view of the second laminated yoke of the electric generator taken along the section line IX-IX of FIG. 7.

As shown in FIG. 2, the yoke 46 has a claw pole type stator yoke 47 and the coil 44. The stator yoke 47 is arranged between the permanent magnet 41 and the coil 44. The core yoke 48 is arranged between an internal portion of the coil 44 and the hub shaft 15. The core yoke 48 is magnetically coupled to the stator yoke 47. In this embodiment, the stator yoke 47 and the core yoke 48 are physically separate entities. FIGS. 5 and 6 show the yoke 46 mounted to the bobbin 55. FIGS. 7 to 9 show the yoke 46 alone. As illustrated in FIGS. 5 to 9, the yoke 46 includes a first laminated yoke 60 and a second laminated yoke 61. The first laminated yoke 60 is mounted on an outside surface of the first flange portion 57 of the bobbin 55. The second laminated yoke 61 is mounted to an outside surface of the second flange portion 58 of the bobbin 55. The laminated yokes 60 and 61 are arranged on opposite axially facing sides of the coil 44.

As shown in FIGS. 7 to 9, each of the laminated yokes 60 and 61 includes a plurality of (e.g., six) plate-like pieces 62 that have been laminated together. The plate-like pieces 62 are made of silicon steel sheets (more specifically, non-oriented silicon steel sheets) with an oxide film formed on the surface. All of plate-like pieces 62 have basically the same shape. Each plate-like piece 62 has a connecting portion 62a and a plurality of (e.g., fourteen) outer circumferential yoke portions 62b. The connecting portion 62a is arranged on an outside of the coil 44. The outer circumferential yoke portions 62b function as the stator yoke 47. In the illustrated claw pole type stator yoke 47, this structure is configured to suppress the occurrence of eddy currents.

The connecting portions 62a are substantially circular disc-shaped portions that are magnetically coupled to the core yoke 48. The connecting portions 62a are stacked along the direction of a center axis of the coil 44. Each of the connecting portions 62a is provided with a plurality (e.g., thirteen) positioning holes 62c. The positioning holes 62c are engaged with the positioning protrusions 57a or 58a so as to position the connecting portions 62a. In this embodiment, the positioning holes 62c are formed in positions lying radially inward of portions located between adjacent ones of the outer circumferential yoke portions 62b. A positioning hole 62c is not formed in a position corresponding to the space between two adjacent outer circumferential yoke portions 62b of the fourteen outer circumferential yoke portions 62b. Among the positioning holes 62c, only four (for example) positioning holes 62c engage with the positioning protrusions 57a or 58a.

Among the outer circumferential yoke portions 62b, those that are close to the permanent magnet 41 are the longest. Thus, if the gap between the inner circumference (radially inward facing portions) of the permanent magnet 41 and the outer circumferential yoke portions 62b that are close to the permanent magnet 41 can be held constant, then the gap with respect to the permanent magnet 41 can be maintained. Consequently, the yoke 46 will be less likely to contact the permanent magnet 41 even if the gap between the permanent magnet 41 and the outer circumferential yoke portions 62b of the first and second laminated yokes 60 and 61 is small.

A through hole 62d is formed in a center portion of the connecting portion 62a of each plate-like piece 62 for the hub shaft 15 to pass through. Slits 62e extending radially from the through hole 62d toward the positioning holes 62c are also formed in the connecting portion 62a of each plate-like piece 62. The slits 62e are provided so that a flat plate-like material can be curved into a circular shape by press forming to obtain a circular plate-like piece 62. The slits 62e also function to impede the flow of eddy currents generated in a circumferential direction of the connection portions 62a due to alternating magnetic flux, thereby suppressing the occurrence of eddy currents. The slit 62e formed in the portion where a positioning hole 62c is not provided extends to the outer circumference of the connecting portion 62a.

The outer circumferential yoke portions 62b of each plate-like piece 62 are folded over at an angle of substantially 90 degrees (i.e., plus or minus five degrees from 90 degrees) from an outer circumferential surface of the connecting portion 62a. The outer circumferential yoke portions 62b of each plate-like piece 62 are arranged between the coil 44 and the permanent magnet 41 with circumferential spaces in-between. The outer circumferential yoke portions 62b are stacked along a radial direction of the coil 44. In this embodiment, the outer circumferential yoke portions 62b are formed to have substantially the same width along their entire length, but it is also acceptable to form them such that they have a tapered shape. The lengths of the outer circumferential yoke portions 62b become gradually shorter as one moves from the side close to the permanent magnet 41 toward the side farther from the permanent magnet 41. The outermost outer circumferential yoke portions 62b face toward a radially inward facing surface of the permanent magnet 41. As shown in FIG. 9, in this embodiment, the outermost outer circumferential yoke portions 62b1 and the outer circumferential yoke portions 62b2 located radially inward thereof have the same length, and the length of the outer circumferential yoke portions 62b3 located radially inward of the outer circumferential yoke portions 62b2 is three fourths the length of the outermost outer circumferential yoke portions 62b1. The length of the outer circumferential yoke portions 62b4 located in the next position farther in the radially inward direction is one half the length of the outermost outer circumferential yoke portions 62b1, and the lengths of the next inward outer circumferential yoke portions 62b5 and the innermost outer circumferential yoke portions 62b6 are one fourth the length of the outermost outer circumferential yoke portions 62b1. By setting the lengths of the outer circumferential yoke portions 62b in this way, the overall thickness of the yoke is large at the proximal end portions of the outer circumferential yoke portions 62b and an alternating magnetic flux can be induced efficiently inside the yoke 46.

The thickness of the individual plate-like pieces 62 used is from 0.25 to 1 mm; a thickness of 0.5 mm provides a high use value in terms of both cost and performance. The same plate-like pieces 62 described above can be used for both the first laminated yoke 60 and the second laminated yoke 61.

The first laminated yoke 60 is positioned by the positioning protrusions 57a of the first flange portion 57. The second laminated yoke 62 is positioned by the positioning protrusions 58a of the second flange portion 58. In his way, the outer circumferential yoke portions 62b of the first laminated yoke 61 are alternately interdisposed with respect to the outer circumferential yoke portions 62b of the second laminated yoke 62 along a circumferential direction.

The plate-like pieces 62 are laminated together and positioned by the positioning protrusions 57a and 58a of the flange portions 57 and 58 of the bobbin 55. As shown in FIGS. 5 and 6, a distal end portion of each of the outermost outer circumferential yoke portions 62b1 is fitted into and held by a recessed portion 57b or 58b formed in the opposing flange portion 57 or 58 of the bobbin 55. A proximal end portion of each of the outer circumferential yoke portions 62b passes through a groove portion 57c or 58c formed in an outer circumferential portion of the flange 57 or 58 in a position opposite the corresponding recessed portion 58b or 57b.

The core yoke 48 is made of a plurality of thin, rectangular plate-like pieces laminated together.

Figure 10:
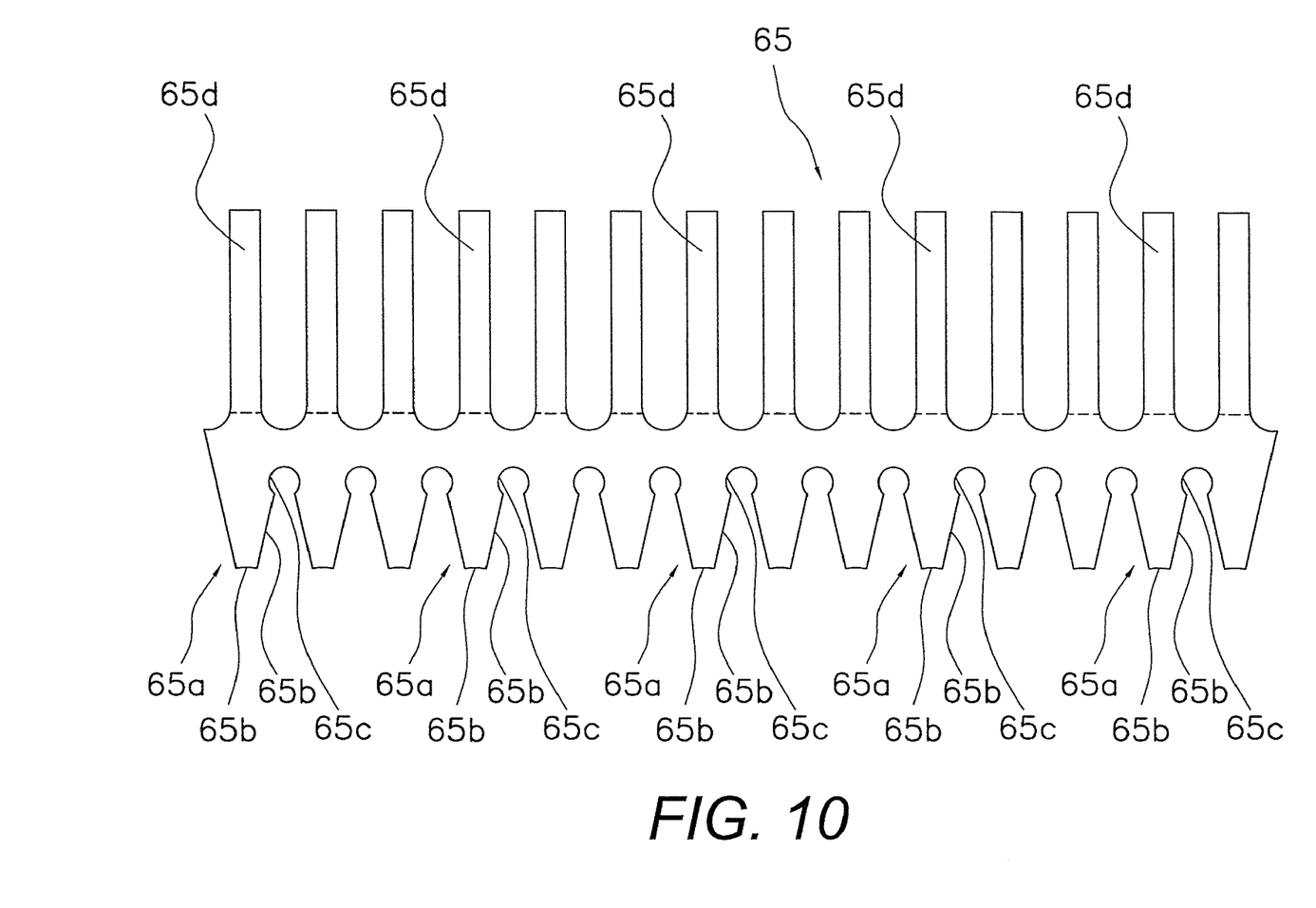
FIG. 10 is a top plan view of a thin plate material used to fabricate a plate-like piece.

As shown in FIG. 10, The plate-like pieces 62 are made by die cutting a silicon steel sheet with a press so as to obtain a thin plate material 65. The thin plate material 65 has shorter protruding portions 65a that will form the connecting portion 62a and longer protruding portions 65d that will form the outer circumferential yoke portions 62b. As shown in FIG. 10, the shorter protruding portions 65a are tapered. The shorter protruding portions 65a have circular arc shaped portions 65b that will form the through hole 62d on the tip ends thereof. The spaces between the tapered sides of the shorter protruding portions 65a will form the slits 62e. Circular portions 65c that will form the positioning holes 62c are also formed between the shorter protruding portions 65a. The longer protruding portions 65d are formed to have uniform widths along the lengths thereof (not tapered) and become the outer circumferential yoke portions 62b when they are bent along the portions corresponding to the broken lines shown in the figure. FIG. 10 shows a plate-like piece 62 that will have an outermost outer circumferential yoke portion 62b1.

Figure 11:
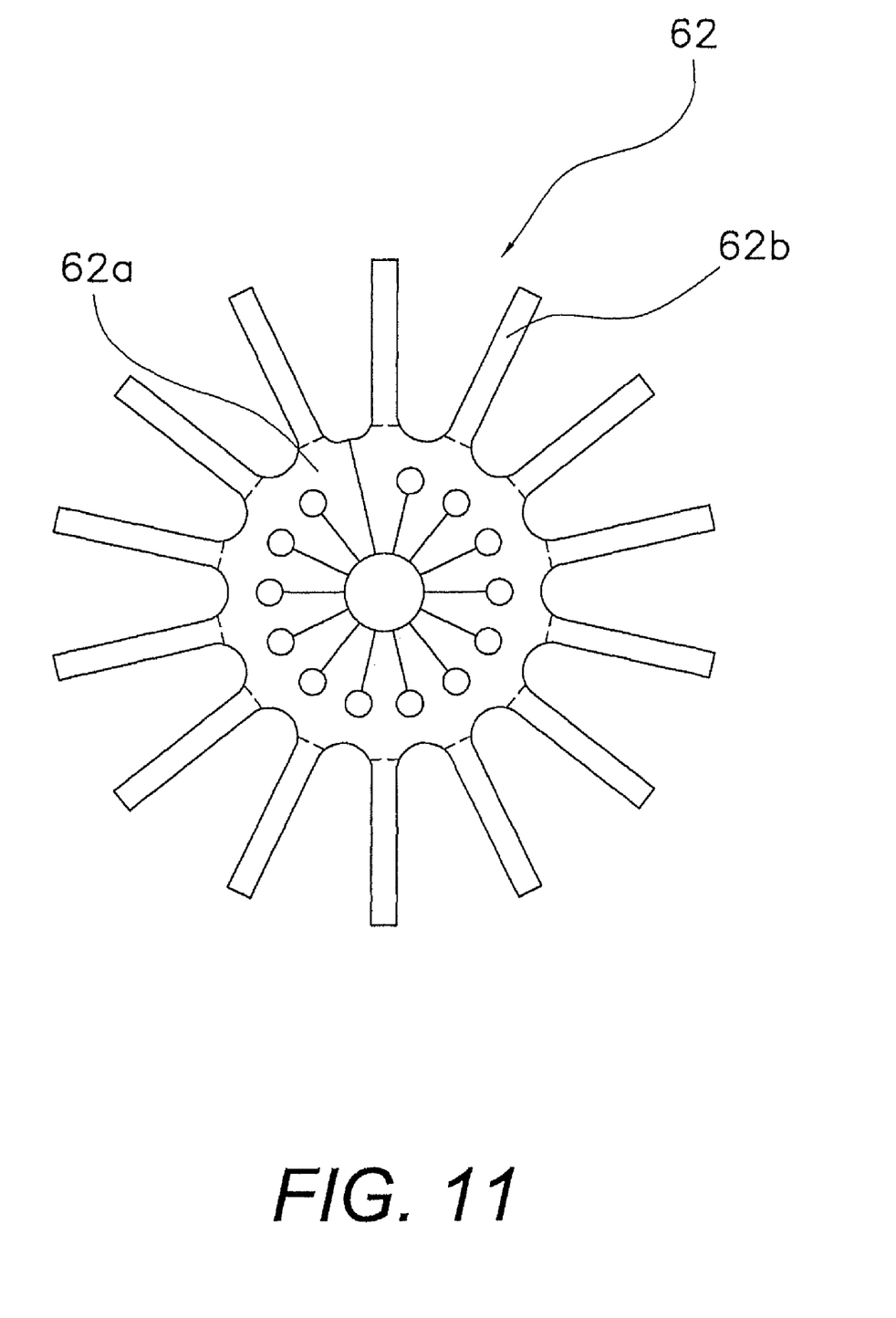
FIG. 11 is a top plan view of a thin plate material that has been bent in a curved fashion.

When the thin plate material 65, shaped as described above, is bent such that the tapered side portions of the short protruding portions 65a fit tightly against one another, the plate-like piece 62 is formed which has outer circumferential yoke portions 62b extending radially outward therefrom as shown in FIG. 11. The radially protruding portions of the plate-like piece 62 are bent approximately 90 degrees to complete the plate-like pieces 62. The plate-like pieces 62 that will fit inside the outermost plate-like piece 62 to form the laminated yokes 60 and 61 are made such that the sizes of the connecting portions 62a thereof are successively smaller by amount approximately equal to the thickness of the plate-like pieces and the lengths of the outer circumferential yoke portions 62b are varied as described previously.

As shown in FIG. 2, the yoke 46 is arranged such that the core yoke 48 is positioned radially inside (inward of) the coil 44 with the outer circumferential yoke portions 62b acting as the stator yoke 47, which are positioned between the coil 44 and the permanent magnet 41.

Electricity generation by the generator hub 10 will now be explained. When the bicycle moves and the front wheel, i.e., the hub shell 18, rotates with respect to the hub shaft 15, the permanent magnet 41 rotates with respect to the internal stationary unit 42, which is fixed to the hub shaft 15. As a result, the permanent magnet 41 rotates around the outside circumference of the coil 44 and the outer circumferential yoke portions 62b of the yoke 46.

The yoke 46 is configured such that when the outer circumferential yoke portions 62b of the first laminated yoke 60 receive magnetic flux from the north poles of the permanent magnet 41, the outer circumferential yoke portions 62b of the second laminated yoke 61 receive magnetic flux from the south poles of the permanent magnet 41. Conversely, when the outer circumferential yoke portions 62b of the first laminated yoke 60 receive magnetic flux from the south poles of the permanent magnet 41, the outer circumferential yoke portions 62b of the second laminated yoke 61 receive magnetic flux from the north poles of the permanent magnet 41. Thus, as the permanent magnet 41 rotates about the outside circumference of the outer circumferential yoke portions 62b of the first and second laminated yokes 60 and 61, the generator repeatedly alternates between a first state and a second state. In the first state, the first laminated yoke 60 is aligned with the north poles and the second laminated yoke 61 is aligned with the south poles. In the second state, the first laminated yoke 60 is aligned with the south poles and the second laminated yoke 61 is aligned with the north poles. Thus, an alternating magnetic flux is produced in the core yoke 48, which magnetically couples the first and second laminated yokes 60 and 61. The alternating magnetic flux generated in the region radially inward of the coil 44 causes an electric current to be generated in the coil 44.

In the yoke 46 configured as described above, the plate-like pieces 62 form a claw pole type stator yoke contrived to suppress eddy currents and the outer circumferential yoke portions 62b that are close to the permanent magnet 41 are long. Consequently, the only the outermost of the outer circumferential yoke portions 62b1 face opposite the permanent magnet 41. Thus, if the gap between the inner circumference of the permanent magnet 41 and the outermost outer circumferential yoke portions 62b1 can be held constant, then the gap with respect to the permanent magnet 41 can be maintained. As a result, the outer circumferential yoke portions 62b 1 will be less likely to contact the permanent magnet 41 even if the gap between the permanent magnet 41 and the outer circumferential yoke portions 62b 1 of the first and second laminated yokes 60 and 61 (each of which is made of a plurality of plate-like pieces 62 laminated together) will be small.

The lengths of the outer circumferential yoke portions 62b1 close to the permanent magnet 41 and lengths of the outer circumferential yoke portions 62b2 located radially inward thereof are the same. Thus, even if the thickness of the material forming the plate-like pieces 62 having the outer circumferential yoke portions 62b is 1 mm or less, the outer circumferential yoke portions 62b1 close to the permanent magnet 41 can be reinforced with the outer circumferential yoke portions 62b2 arranged inward thereof. As a result, the strength of the outer circumferential yoke portions 62b can be ensured even if the plate-like pieces 62 are made of a thin plate material.

Since the outer circumferential yoke portions 62b are folded over from the connection portion 62a at angles of substantially 90 degrees, the outermost outer circumferential yoke portions 62b1 are made to face opposite the inner circumferential portions of the permanent magnet 41 in a more precise fashion and the outer circumferential yoke portions 62b1 are even less likely to contact the permanent magnet 41.

With this embodiment, it is easier to neatly arrange the windings of the coil 44 because the coil 44 is wound onto the bobbin 55. Additionally, the bobbin 55 can be used to more easily position the first and second laminated yokes 60 and 61.

Although in the previously described embodiment, the sizes of the connecting portions 62a of the laminated plate-like pieces 62 are successively smaller as one moves from the outside inward, it is also acceptable for the sizes of the connecting portions 62a to be the same. In such a case, the plate-like pieces 62 can be fitted together by adjusting the positions where the radially extending portions are folded over in accordance with the thickness of the plate-like material. Also, in such a case, the lengths of the outer circumferential yoke portions 62b will be the length of the tips extending from the bent portions.

In the previously described embodiment, in order to increase the yield obtained from the thin plate-like material 65, the plate-like pieces 62 are fabricated by bending the thin plate-like material 65 in a curved fashion and then folding over the outer circumferential yoke portions 62b. However, the method of fabricating the plate-like pieces is not limited to the previous embodiment. For example, a member having radially emanating portions like that shown in FIG. 11 can be die cut directly from a steel sheet.

Although the previously described embodiment presents an example in which a front wheel is mounted to the generator hub, the previously described embodiment can also be applied to a generator hub onto which a rear wheel is mounted.

Although in the previously described embodiment each of the laminated yokes 60 and 61 includes six plate-like pieces, any number of plate-like pieces is acceptable as long as it is two or more.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A claw pole generator comprising:
a circularly arranged permanent magnet; and
an internal stationary unit including a ring-shaped coil arranged radially inward of the permanent magnet and a yoke surrounding a perimeter of the coil, the permanent magnet being rotatably arranged with respect to the internal stationary unit,
the yoke including a stator yoke and a core yoke, with the stator yoke being arranged between the coil and the permanent magnet, and the core yoke being arranged radially inward of the coil and magnetically coupled to the stator yoke,
the stator yoke including a first laminated yoke and a second laminated yoke, with each of the first and second laminated yokes including at least two plate-like pieces having a substantially circular disc-shaped connecting portion arranged on one side of the coil and a plurality of outer circumferential yoke portions that are folded over from an outer circumferential surface of the connecting portion and arranged between the coil and the permanent magnet with circumferential spaces in-between, and
the connecting portions of each of the first and second laminated yokes having a plurality of connecting layers overlying each other in an axial direction with respect to an axial centerline of the coil, each of the outer circumferential yoke portions having a plurality of outer circumferential yoke layers laminated overlying each other along a radial direction with respect to the axial centerline of the coil, each of the outer circumferential yoke portions having an outermost one of the outer circumferential yoke layers that is closest to the permanent magnet with a longer axial length than an innermost one of the outer circumferential yoke layers.

2. The claw pole generator according to claim 1, wherein the outermost one of the outer circumferential yoke layers and an immediately adjacent one of the outer circumferential yoke layers have the same axial length.

3. The claw pole generator according to claim 1, wherein the outer circumferential yoke portions extend from the connection portions at angles of substantially 90 degrees.

4. The claw pole generator according to claim 1, wherein the core yoke is formed as a separate entity from the first and second laminated yokes with the connecting portions of the first and second laminated yokes being magnetically coupled to the core yoke.

5. The claw pole generator according to claim 1, wherein the internal stationary unit further includes a bobbin having a cylindrical portion extending in an axial direction and a pair of flange portions provided on both axially facing ends of the cylindrical portion, the coil being wound onto an externally facing circumference of the cylindrical portion.

6. The claw pole generator according to claim 1, wherein the outermost one of the outer circumferential yoke layers of each of the outer circumferential yoke portions of the first laminated yoke has a free end overlying one of the flange portions of the bobbin that is farthest from the connecting portion of the first laminated yoke; and
the outermost one of the outer circumferential yoke layers of each of the outer circumferential yoke portions of the second laminated yoke has a free end overlying one of the flange portions of the bobbin that is farthest from the connecting portion of the second laminated yoke.

7. The claw pole generator according to claim 1, wherein the internal stationary unit further includes a hub shaft that is configured to be mounted to a bicycle frame of a bicycle; and
the permanent magnet includes a cylindrical hub shell with bearings rotatably supporting the hub shell with respect to the hub shaft.

8. The claw pole generator according to claim 7, wherein the outermost one of the outer circumferential yoke layers and an immediately adjacent one of the outer circumferential yoke layers have the same axial length.

9. The claw pole generator according to claim 7, wherein the outer circumferential yoke portions extend from the connection portions at angles of substantially 90 degrees.

10. The claw pole generator according to claim 7, wherein the core yoke is formed as a separate entity from the first and second laminated yokes with the connecting portions of the first and second laminated yokes being magnetically coupled to the core yoke.

11. The claw pole generator according to claim 7, wherein the internal stationary unit further includes a bobbin having a cylindrical portion extending in an axial direction and a pair of flange portions provided on both axially facing ends of the cylindrical portion, the coil being wound onto an externally facing circumference of the cylindrical portion.

12. The claw pole generator according to claim 7, wherein the outermost one of the outer circumferential yoke layers of each of the outer circumferential yoke portions of the first laminated yoke has a free end overlying one of the flange portions of the bobbin that is farthest from the connecting portion of the first laminated yoke; and
the outermost one of the outer circumferential yoke layers of each of the outer circumferential yoke portions of the second laminated yoke has a free end overlying one of the flange portions of the bobbin that is farthest from the connecting portion of the second laminated yoke.

* * * * *